Figure 1:
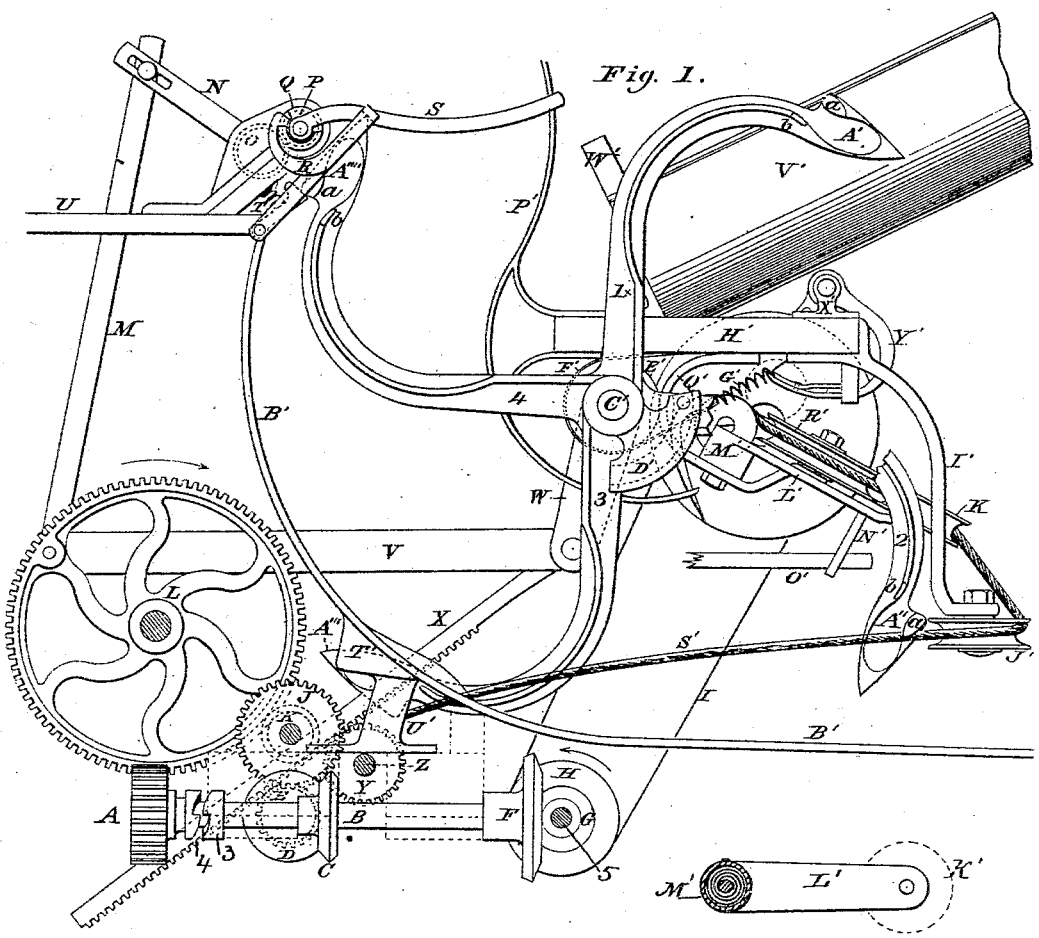

(No Model.) 3 Sheets—Sheet 1.
G. H. HOWE.
AUTOMATIC BINDING MACHINE.

No. 321,438. Patented July 7, 1885.

WITNESSES. INVENTOR.

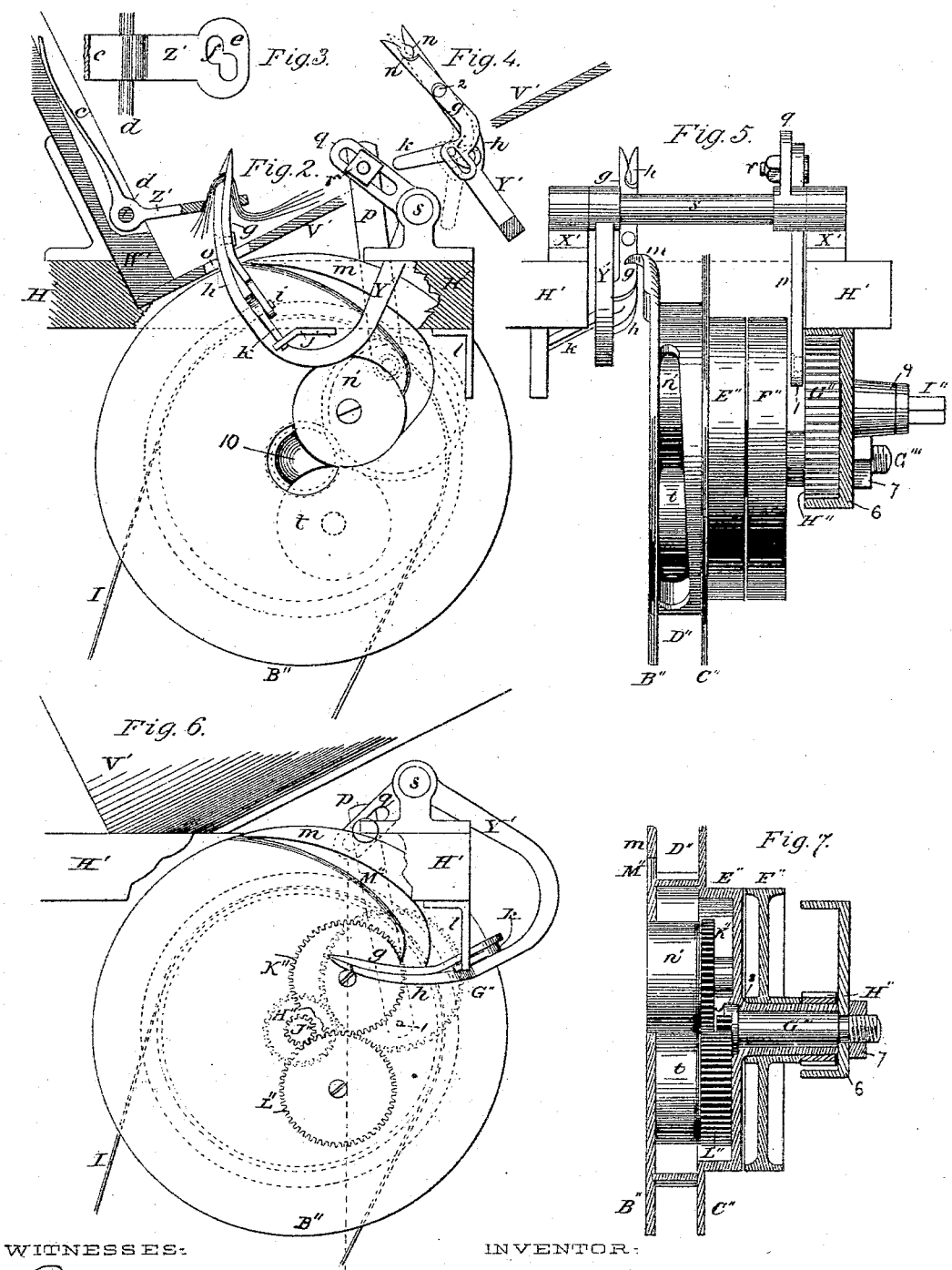

(No Model.)
G. H. HOWE.
AUTOMATIC BINDING MACHINE.
No. 321,438. Patented July 7, 1885.
3 Sheets—Sheet 3.
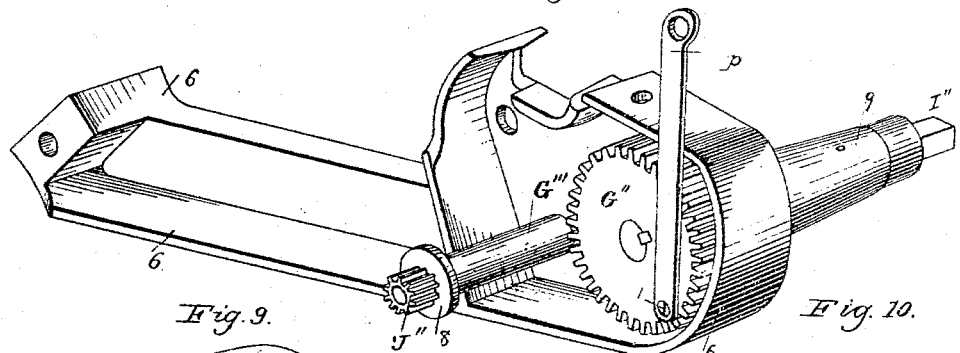
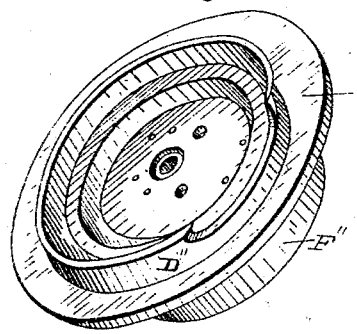
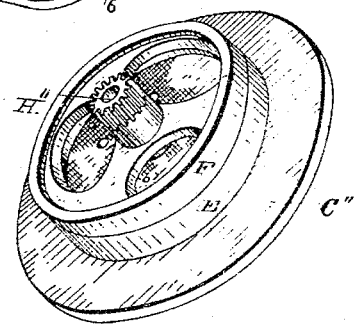
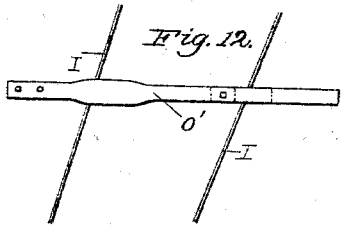
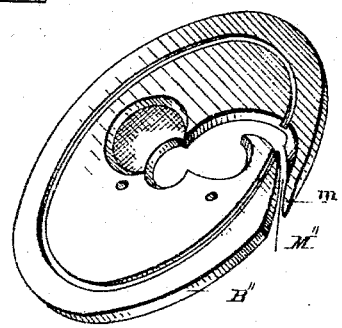
WITNESSES:
W B Marsson
Danforth Geer
INVENTOR:
George Hutchins Howe

UNITED STATES PATENT OFFICE.

GEORGE HUTCHINS HOWE, OF HOOSICK FALLS, NEW YORK.

AUTOMATIC BINDING-MACHINE.

SPECIFICATION forming part of Letters Patent No. 321,438, dated July 7, 1885.

Application filed April 7, 1883. (No model.)

*To all whom it may concern:*

Be it known that I, GEORGE H. HOWE, of the village of Hoosick Falls, county of Rensselaer and State of New York, have invented certain new and useful Improvements in Automatic Binding-Machines; and I do declare the following to be a full, accurate, and complete description of the same, reference being had to the accompanying drawings, making part of this specification, in which—

Figure 1 is a front end elevation of a portion of the binder. Figs. 2, 3, 4, 5, 6, 7, 8, 9, 10, 11, 12, and 13 are representations of the band-forming mechanism and its relation to the binding apparatus in detail.

Similar letters of reference refer to the same parts in the different figures.

To enable others skilled in the art to make and use my invention, I will proceed to describe the same in reference to the drawings.

The nature and object of this invention are to make a continuous twisted straw rope by machinery located on an automatic harvesting and binding machine, and to present the rope when so made to the binding mechanism as fast as required to bind bundles of grain or other crops.

A' A" A'" A"" are the binding-arms, which separate the bundle to be bound from the inflowing grain, carry the band around the bundle, and present the same to the band-securing mechanism.

The movement of the arms, the mechanism which actuates them, and their mode of operation, are the same as shown in my previous Patent No. 204,329, granted May 28, 1878. The band-securing mechanism, the mechanism for driving it, and its mode of operation are also the same as shown in my said patent of May 28, 1878. The arms A' A" A'" A"" are made in the same shape as shown in my patent of 1878, aforesaid, and designated there as arms E, except the head is so made that the opening designated there as E⁴ is closed up on the side opposite the shoulders designated in said patent as E⁵ and E⁶. The object of this change is to commence the doubling back of the band before it reaches the guide designated in said patent as P.

S', Fig. 1, is the band shown as it leaves the guide-pulley J', and extends over the binding-platform to the band-securing mechanism. The arms A' A" A'" A"" in turn take the band and carry it around the bundle to the band-securing mechanism in the same manner as in my patent of 1878, aforesaid.

I will now proceed to describe the method of making the straw rope to form the bands and the method of presentation of the rope to the arms A' A" A'" A"", which embrace the invention claimed in this specification.

H' is a plank supported by the shaft C' and the main frame in any suitable manner. On the plank H' is supported the receptacle V', which holds the straw of which the rope for binding is to be made. This receptacle is curved in form and open on its top side to admit the placing of the material readily into it, and is set upon the plank or other support in an inclined position. The lower end of the receptacle is closed by the end piece, W', against which the ends of the straws rest, and its lower end rests in an opening in the plank H', and through this opening in H' and an opening in the receptacle the straw is taken to the band-forming machinery. The bottom of the receptacle V' has a hole in it immediately over the hole in H', so that when the straws are placed in the receptacle, they will lie over this hole in the receptacle and thus present a portion of their surface near their ends to the picker to be taken out by it, as hereinafter more fully described.

Y' is the picker, which is mounted on a rock-shaft, S, which turns in bearings X', bolted on plank H'. Y' is fastened to rock-shaft S firmly by set-screw or any well-known device. The shaft S is made to rock in its bearings by means of a slotted crank, q, which is connected to pitman p by a pin, r, the slot being provided for the purpose of giving more or less movement to the shaft and through the shaft to the picker Y', as may be required. The pitman p at its lower end is attached to a crank-pin, 1, on gear-wheel G". The picker Y' is made in three parts, g, h, and k. One portion, h, is a curved piece which forms the main portion of Y', and to which the parts g and k are pivoted. The upper portion of h is pointed and has a cavity or recess filed in it a short distance from its point, which forms one portion of the opening, as shown at n, Fig. 4. g is another and shorter curved piece, and is fitted to the inner curve of h and pivoted to it at 2, Fig. 4. Its upper end is partially cut away, so as to form the other portion of the opening at n, Fig. 4. Its lower end is provided with a slot in which a pin, i, works. This pin is fast in the piece k. k is pivoted to h below the point where g is pivoted to h, and g is sufficiently bent away from h to receive k between itself and h. k has a projection which extends out nearly at right angles to h, so that when the picker Y' is partially rotated upward that portion of k will strike the iron j, which is fast to plank H', and through the pin i on k and the slot in g cause g to oscillate on its pivot and move its jaw toward the jaw in h, like nippers, and in the downward movement of Y' the reverse motion is obtained and the jaws are opened by the same projection on k striking on the iron l, also fastened to the under side of plank H'. The picker Y' being partially rotated, its points pass up through the hole O in the receptacle V', and when they pass into it the jaws of g and h are open, and thus take in a few of the straws, (sufficient to feed the band-forming apparatus,) and when the points of Y' have reached nearly to their extreme throw in the receptacle the projection k strikes against the iron j and closes the jaws, and thus grasps the straws firmly in opening n. Then the reverse movement takes place, and the picker draws the straws so inclosed through the opening in the receptacle, and at the proper time, the projection k striking the iron l, the jaws are opened and release the straws which have been delivered to the band-forming mechanism to be made into the band, as will be more fully explained.

In order to insure the straws being always in position to be caught in the jaws, and that the points may not press the straws upward instead of seizing them, a bent plate, Z', is hinged to the end W' of the receptacle on the pin d. One part of this plate, c, is nearly at a right angle to the other part, and is made thin and curved, so as to form a spring, which presses against the part W' and causes a pressure of the other part on the straws over the hole in the receptacle and close to the picker, an opening, f e, being provided in Z' to permit the points of the picker to pass through. The straws, when placed in the receptacle, are placed under the spring-plate Z', and are thus held down over the hole in the receptacle. Should the jaws be made to open wide enough, this spring-plate may be dispensed with.

On the frame of the machine is mounted a shaft, B, which receives motion from clutches 3 and 4, clutch-half 4 is driven by spur-pinion A, which meshes into the spur-gear or the master or driving wheel of the reaper or harvester; or it may be driven in any well-known manner by the driving-wheel, and when clutch-half 4 is engaged with clutch-half 3, (which can be so engaged or disengaged by the operator of the machine at will by any well-known means) motion will be imparted to shaft B, which will give motion to bevel-wheel C, which imparts motion to bevel-wheel D, on which is cast the gear-wheel E, which gives motion to the binding apparatus, and by the bevel-wheel F imparts motion to the bevel-wheel G, rigidly fastened to shaft 5, which revolves in the direction of the arrow, Fig. 1. On shaft 5 is rigidly fastened the pulley H, and from this pulley H passes a band, I, which runs on either E'' or F''. E'' is fast to the band-former and communicates motion to it. F'' is a loose pulley, and when the band I passes over it, the band-former will remain at rest. An iron frame or casting, 6, is bolted to the frame of the machine, or may be made a part of the frame and supports the band-forming mechanism. Into the casting 6 is fastened the stud-axle G''' and held securely to it by the nut 7. This stud is made with a shoulder which is drawn up tight against the surface of the casting, and its end opposite the nut is provided with a small spur-pinion, J'', and a collar, 8, back of the pinion J''. The pulley D'' of the band-former is mounted on the stud-axle G''' and turns freely thereon between the face of the casting 6 and the collar 8. The tight pulley E'' is cast fast to the pulley D''. The hub of the pulley D'' is made long, and on its end is fastened the gear-wheel H'', which meshes into gear-wheel G'', which is fastened rigidly to the shaft I'', which shaft turns freely in a bearing, 9, cast on the frame or casting 6. The end of pitman p is attached to gear-wheel G'', and gives motion to the picker Y', as hereinbefore described. Between the gear-wheel H'' and the pulley D'' is placed the loose pulley F''', which turns freely on the hub of the pulley D''. An annular ring, C'', extends around the pulley D'', and the face or rim of the pulley is cut away, as shown in Fig. 5. On the side face of the pulley D'', next the loose pulley and between its center and the cutaway portion of its face, are two rollers, n' and t, which turn freely on their studs, which are fast to the side face of the pulley D''. The roller t is furnished with a gear, L'', which receives a rotary motion on its own axis from the fixed pinion J'', and this gear L'' meshes into gear K'', fast to roller n', and thus imparts motion to n', the teeth of L'' being longer than the teeth of K''. A disk, B'', is fastened onto the pulley D'' with screws. This disk has a round hole in it of sufficient size to allow the roller n' to pass through it, the end face of the roller being flush with the plane of disk B''. The roller t does not extend clear through the disk, but partially through, the disk being bored out sufficiently to receive it, as shown in Fig. 11, to prevent straws from wedging in between the roller and the disk. The disk B'' has a smaller circular hole in the center, which runs into the hole for the roller n'. This hole is of sufficient size to allow the rope to pass out, and the rollers n' and t are located on the side of the central hole for the passage of the rope. This disk B'' is also cut away from its circumference to the periphery of the roller n', leaving an opening, M'', as shown in Figs. 2, 6, 7, and 11, and the lip m is bent out away from the plane of the disk so as to leave an opening between the plane of the disk and the lip, the lip being somewhat tapered to make a sort of hook for the purpose of catching onto the straws brought to it by the picker, as shown in Fig. 5. The space between the disk B″ and the opposite face of the pulley D″ is filled in, so as to shield the gears on n′ and t, and at the center, where the hole in the disk is, the material is cut away or chamfered, so as to make a tapering hole for the exit of the rope, as shown at 10, Fig. 2. It is plain that if the band is on the fast or band-former pulley E″, and the machine is set in motion, the pulley D″ will revolve around the fixed pinion J″, and thus motion will be imparted to the rollers n′ and t on their own axes in opposite directions, and motion will also be imparted through pinion H″ to gear G″, and thus to the picker. The operation of making the straw rope is as follows: A bundle of straws of sufficient length is placed in the receptacle and under the pressure-plate Z′. The harvester is set in motion, and the pulley D″ revolves around the fixed pinion J″, and motion is imparted to the rollers n′ and t. The picker enters the receptacle, and, through the mechanism already described, grasps a few straws—say three to five—and withdraws them from the receptacle. The motion of the picker is so timed in relation to the motion of the band-forming mechanism that it withdraws from the receptacle with its mouthful of straw just in front of the lip m of the disk B″. The straws are taken into the opening M″, and pass down the opening toward the center, past the roller n′, and is squeezed between the roller n′ and the edge of the disk where the disk is cut away to receive the roller n′. At this point the jaws of the picker are opened by the projection k striking the iron l, and releases the straw, which is then caught between the two rollers n′ and t, and passes out through the hole in the center of the disk. The end thus passed out being held taut, the revolution of the band-forming mechanism twists the straws into a rope or band. The space between the flanges C″ and B″ is made wide enough to hold sufficient straw to make the rope, and the pulley D″ is made of sufficient size, which must equal in circumference the length of the straw to be used. The picker is arranged to take out of the receptacle a number of straws sufficient to form the rope once to every two revolutions of the pulley D″, and carries the portion so taken out to the rollers n′ and t. The lip m having passed by and embraced the straw, guiding it between the flange on the pulley D″ and disk, the picker releases its hold, and the continued revolution of the pulley D″ immediately commences and completes the withdrawal of the portion of straw so taken hold of and partially drawn out of the receptacle by the picker before the picker returns for the next succeeding portion. By this arrangement, the picker carries the end of each portion of straw held by it directly to the body of the rope without the intervention of other devices, and holds onto it until it is caught between the rollers n′ and t. A support, Q′, is firmly fastened on the under side of the plank H′, which is of curved form, and made in shape to support the grooved pulley R′, which turns freely on its stud. On this support Q′ is placed another support, L′. On the end of L′ is supported another grooved pulley, K′. The support L′ is fastened to Q′ at its rear, and is furnished at the place of its attachment with a hub or casing, M′, of sufficient size to contain a volute spring, which is attached to the stud, and support M′ in such a way as to act on the support and allow it to yield back and forth. Another support, I′, is rigidly attached to the plank H′ at or near one corner, which extends downward and supports another grooved pulley, J′. The grooved pulley R′ is located with its edge in close proximity to the hole in the band-forming device. When the band is made of sufficient length, it is passed from the hole in the band-forming device over an arc of the circumference of the pulley R′ toward the front of the machine, and then over an arc of the circumference of the pulley K′ toward the back of the machine, then over the fixed grooved pulley J′, and thence to the jaws of the holder in the band-securing apparatus, as shown in Fig. 1, and the machine is then ready to work, the straw band being thus presented to the binding-arms and other binding mechanism, as shown and described in my patent of 1878, aforesaid. On the arm L′ is fastened an arm, N′, extending downward, which passes and strikes against a spring forked belt-shifter O′, which is fastened to the frame of the machine. One end of O′ is shown in connection with N′ in Fig. 1, the other end being broken off, and O′ is also shown in Figs. 12 and 13. This shifter serves to move the belt I from the tight to the loose pulley, and vice versa.

It is necessary in the use of the machine to always have a supply of band made sufficient to bind a bundle, and the different parts of the mechanism must be so timed and arranged that a supply of binding rope or band will always be presented to the binding-arms at the right time to bind the successive bundles. To accomplish this result with certainty, I provide a capacity for making a surplus quantity of band if the band-forming device is kept constantly running. For this reason the mechanism is so arranged for making the band that it will be set in motion or stopped automatically by the machine as the wants of the binding mechanism may require. The arm L′ being made so as to swing on its pivot-support, and being actuated by the spring, presses the grooved pulley K′ against the rope and always keeps it taut, and when there is more rope made than is used the arm L′ will swing far enough to take up a certain amount of the surplus, and when it has moved the grooved pulley K′, and with it the rope, to the fullest extent of its movement, the arm N′ strikes the belt-shifter O' and throws the belt I onto the loose pulley, and the band-making mechanism stops. As soon as this surplus band is required, the tension given to the band by the binding apparatus drawing on the band overcomes the spring, and the shifter then throws back the band I onto the tight pulley and the band-making mechanism is again set in motion.

Having thus described my invention, what I claim therein as new, and desire to secure by Letters Patent, is—

1. The combination of the rotating pulley D" and disk with the vibrating picker, substantially as and for the purpose described.

2. The combination of the fixed receptacle, constructed with an opening in the bottom, with a vibrating picker and a pulley, D", substantially as and for the purpose described.

3. The combination of the stationary receptacle, the band-forming mechanism and the picker, and mechanism for operating the same, as described, whereby the picker partially withdraws the straw from the receptacle, a small quantity at a time, and delivers it to the band-forming mechanism, which completes the withdrawal of the same during the process of forming it into a band, substantially as described.

4. The automatic band-forming device composed of the pulley D", the disk B", and the rollers $n'$ and $t$, arranged and operating substantially as described.

5. The combination of the revolving pulley D", with its disk B", the rollers $n'$ and $t$, and the fixed pinion J", substantially as and for the purpose described.

6. The combination of the pulley D" and its disk B", rollers $n'$ and $t$, and loose pulley F'", substantially as described.

7. The combination of the rollers $n'$ and $t$ with the pulley D" and its disk B", the rollers being incased by and included between the wheel D" and the disk B".

GEORGE HUTCHINS HOWE.

Witnesses;
  DANFORTH GEER,
  W. B. MASSON.